Oct. 21, 1969    S. R. COLBERG    3,474,267
PIEZOELECTRIC TRANSDUCER
Filed June 23, 1967

INVENTOR.
STEPHEN R. COLBERG
BY
ROY MILLER
ATTORNEY.

United States Patent Office 3,474,267
Patented Oct. 21, 1969

3,474,267
PIEZOELECTRIC TRANSDUCER
Stephen R. Colberg, China Lake, Calif., assignor to the United States of America as represented by the Secretary of the Navy
Filed June 23, 1967, Ser. No. 649,430
Int. Cl. H02n 1/00
U.S. Cl. 310—8.1                 5 Claims

ABSTRACT OF THE DISCLOSURE

The signal applied to the crystal system of a piezoelectric transducer is controlled by an inverse magnetostrictive feedback signal derived from a coil wound around the transducer near the juncture of a crystal element and an attached resonator.

---

Figure 1:
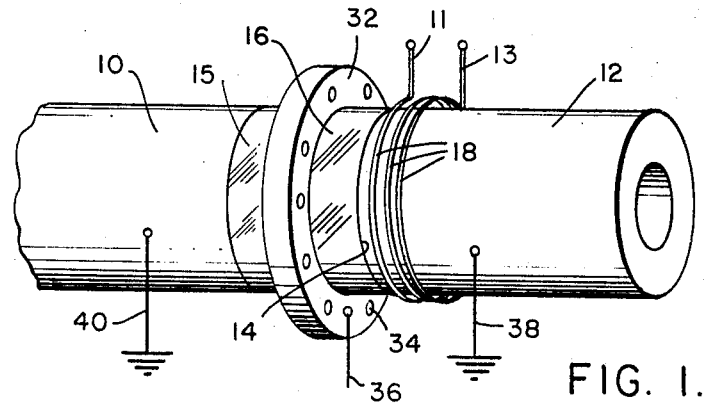

The invention described herein may be manufactured and used by or for the Government of the United States of America for governmental purposes without the payment of any royalties thereon or therefor.

Background of the invention

The present invention relates to devices for utilizing ultrasonic vibrations and particularly to those devices utilizing a piezoelectric crystal and a magnetostrictive component of the resonant system and most particularly to the means for supplying power signals to the crystal. If an iron rod is subjected to an increasing longitudinal magnetic field its length at first increases slightly. This is known as the Joule effect or positive magnetostriction. Conversely, a ferromagnetic material when deformed under pressure or strain will undergo an inverse Joule effect or a change in magnetic induction (B) within the material. This phenomenon is also known as the Villari effect.

Ultrasonic transducers, such as the device modified according to the present invention, ordinarily comprise a piezoelectric crystal fastened to a λ/4 resonator. When an alternating voltage is impressed on the crystal at or near the natural frequency of vibration of that particular crystal, the crystal will undergo elongation or contraction depending upon the direction of the applied voltage. Such a crystal thus excited is a source of mechanical energy. For example, when the crystal is fastened by connecting devices to tools or machines, this ultrasonic vibration may be made to do useful work. Ultrasonic electromechanical transducers have found many applications including the mixing of ordinarily immiscible liquids, the dispersion of metals in liquids, the precipitation of smoke, the destruction of bacteria, the testing of materials, and the machining of hard to machine solids, to name only a few.

Since the transducer is most effective when operated at or near its natural frequency of vibration, very accurate oscillators, carefully tuned to the desired frequency, and sometimes controlled by automatic frequency control devices, have been used to drive the crystal or crystal system. In some applications, some kind of feedback pickup has been placed in the system and the signal from the pickup returned to the drive oscillator to change the frequency of the oscillator when the natural frequency of the transducer varied. Such drive systems have been bulky, expensive and complicated and, even so, not sufficiently reliable for some applications. Manually adjustable systems could not, of course, follow changes in transducer resonant frequency with the accuracy and stability necessary to maintain oscillations at the optimum resonant frequency.

Summary of the invention

Taking advantage of the physical phenomenon known as the Villari effect, the present invention provides a pickup coil surrounding a portion of a piezoelectric transducer and through an impedance matching transformer and appropriate filtering, phase shifting and amplifying circuitry, uses the signal induced in the pickup coil as a means to accurately drive the crystal system at its resonant frequency.

Accordingly, it is an object of the present invention to provide a simple crystal drive system which will replace conventional open loop electronic oscillators and which will instantly follow changes in transducer resonant frequency and, thus, provide a reliable signal of maximum accuracy and stability.

Another object of the invention is to provide a closed loop system for maintaining vibrations in a mechanical oscillator through means of a simple modification of available equipment.

Figure 2:
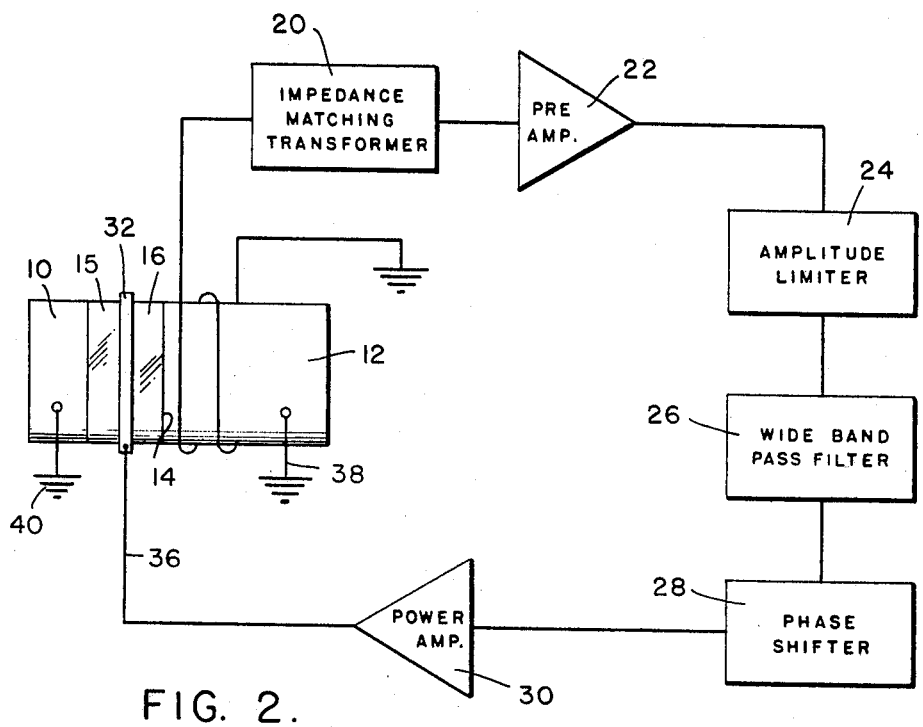

Other objects, advantages and novel features of the invention will become apparent from the following detailed description of the invention when considered in conjunction with the accompanying drawings wherein:

FIG. 1 is a perspective view of a typical transducer embodying the invention; and FIG. 2 is a schematic drawing, in block diagram form, of the components and their manner of interconnection in a preferred embodiment of the invention.

Detailed description of the preferred embodiment

The typical transducer shown in FIG. 1 comprises a system consisting of crystals 15 and 16 which are placed in complementary position on either side of an electrode or voltage supply plate 32. The electrode which is used to apply high voltage to the crystal unit, generally, has a number of regularly spaced holes 34 to facilitate the dissipation of heat. A steel resonator 12 is fastened to the crystal system on one side and an adapter fitting 10 is fastened to the opposite side. The adapter fitting 10 may, for example, hold a work tool or serve to fasten the unit onto a container or machine. Transducers of this type are conventionally driven from a tunable oscillator the output of which is connected at 36 to electrode 32. The resonator 12 and the adapter 10 are maintained at ground potential as indicated by the symbols at 38, 40.

According to the invention, a feedback signal is derived from the transducer by passing a coil of wire 18 around the transducer near the juncture 14 between the resonator 12 and the crystal element 16. Because of the changes in magnetic induction, the Villari effect, an alternating current will be induced in the coil of the exact resonant frequency of the transducer. Placing the coil on the resonator avoids possible interference with vibration of the crystal but the coil is placed as near as possible to the joint 14 to maximize the Villari effect.

The method of utilizing the signal derived inductively from the transducer will be evident from the block circuit diagram (FIG. 2) and its relationship with the transducer 12. In order to obtain maximum power delivered to the load, the induced signal is first delivered to the primary coil of an impedance matching transformer, 20. The signal from the secondary of transformer 20 is passed through a preamplifier 22 and an amplitude limiter 24 to the band-pass filter 26. The filtered signal is then passed through the phase shifter 28 and after being amplified to the desired level by power amplifier 30 is impressed upon the crystal system through the electrode 32.

The driving arrangement according to the invention may be applied to any ultrasonic transducer operating at resonance if (a) a portion of the resonant system consists of piezomagnetic material and (b) that piezomagnetic portion is near the stress maximum of the resonating system.

What is claimed is:
1. A vibratory transducer comprising:
vibratory drive means having a maximum excursion at a single frequency;
ferromagnetic means, mechanically attached to said drive means, having a resonant frequency equal to said single frequency;
signal producing coil means, in proximity to said ferromagnetic means, adapted to sense said resonant frequency and, in turn, produce an output signal representative of said resonant frequency;
power amplifying means having an input and output;
the output of said amplifying means being coupled to said drive element and said signal being coupled to said input.

2. Apparatus according to claim 1 wherein:
circuit means is provided for coupling said signal to the input of said amplifying means;
said circuit means comprising frequency sensitive filter means and phase shifting means.

3. Apparatus according to claim 2 wherein said filter means is a wide band pass filter.

4. Apparatus according to claim 2 wherein said circuit means further comprises signal amplitude limiting means before said filter means.

5. Apparatus according to claim 1 wherein
said vibratory drive means comprises a hollow, cylindrical piezoelectric crystal;
said ferromagnetic means comprises a hollow cylindrical steel resonator;
said coil is wound on said ferromagnetic means in close proximity to the juncture thereof with said drive means; and
circuit means is provided to shape, filter and properly phase said signal before it is coupled to the input of said amplifying means.

References Cited

UNITED STATES PATENTS

| 3,218,488 | 11/1965 | Jacke | 310—8.2 |
| 3,394,274 | 7/1968 | Jacke et al. | 310—8.2 X |
| 3,368,085 | 2/1968 | McMaster et al. | 310—8.2 X |
| 3,024,428 | 3/1962 | Warman | 333—17 |
| 2,825,808 | 3/1958 | Doelz et al. | 333—71 X |
| 2,806,328 | 9/1957 | Bradfield | 310—8.1 |
| 2,573,168 | 10/1951 | Mason et al. | 310—8.2 X |

MILTON O. HIRSHFIELD, Primary Examiner

MARK O. BUDD, Assistant Examiner

U.S. Cl. X.R.

310—8.2, 8.3